United States Patent [19]
Marie et al.

[11] Patent Number: 4,747,138
[45] Date of Patent: May 24, 1988

[54] METHOD OF SCRAMBLING TELEVISION PICTURES AND ARRANGEMENT FOR DESCRAMBLING THE PICTURES THUS SCRAMBLED

[75] Inventors: Gérard J. M. Marie, Santeny-Villecresnes; Jean-Pierre Arragon, Roissy, both of France

[73] Assignee: La Radiotechnique, Suresnes, France

[21] Appl. No.: 527,620

[22] Filed: Aug. 29, 1983

[30] Foreign Application Priority Data

Sep. 14, 1982 [FR] France ............................... 82 15533

[51] Int. Cl.$^4$ ............................................. H04N 7/167
[52] U.S. Cl. ............................................. 380/14; 380/20; 380/10
[58] Field of Search ............... 358/120, 123, 122, 119, 358/114

[56] References Cited

U.S. PATENT DOCUMENTS

4,070,693  1/1978  Shutterly ............................. 358/123
4,335,393  6/1982  Pearson ................................. 358/12

Primary Examiner—Stephen C. Buczinski
Assistant Examiner—Melissa L. Koltak
Attorney, Agent, or Firm—William J. Streeter; Edward W. Goodman; Gregory P. Gadson

[57] ABSTRACT

Method of scrambling television pictures for which the video signals of each scanning line are of the M.A.C. type, that is to say time-division multiplexing of the analog chrominance and luminance components, characterized in that on transmission the components are each divided, in each line, one after the other, into two consecutive signals C and D, on the one hand, and F and G, on the other hand, the first signal C and F of which are then delayed for the duration of the second signal, and the second signals D and G are advanced for the duration of the first signals, the reference periods B and E which precede these respective components being excluded from this processing operation, the positions of the dividing points being derived from pseudo-random digital sequences, and the processing operation being intended to be applied on reception in the opposite sense for the simultaneous recovery of the luminance signal Y and the color difference signals U and V.

3 Claims, 1 Drawing Sheet

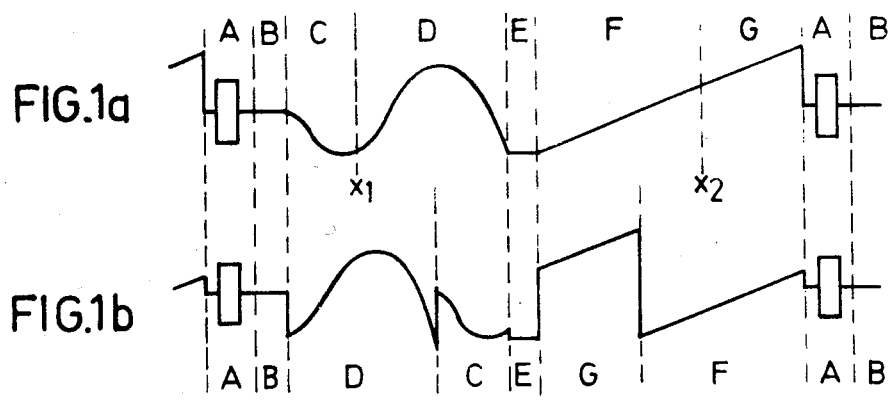
FIG.1a
FIG.1b
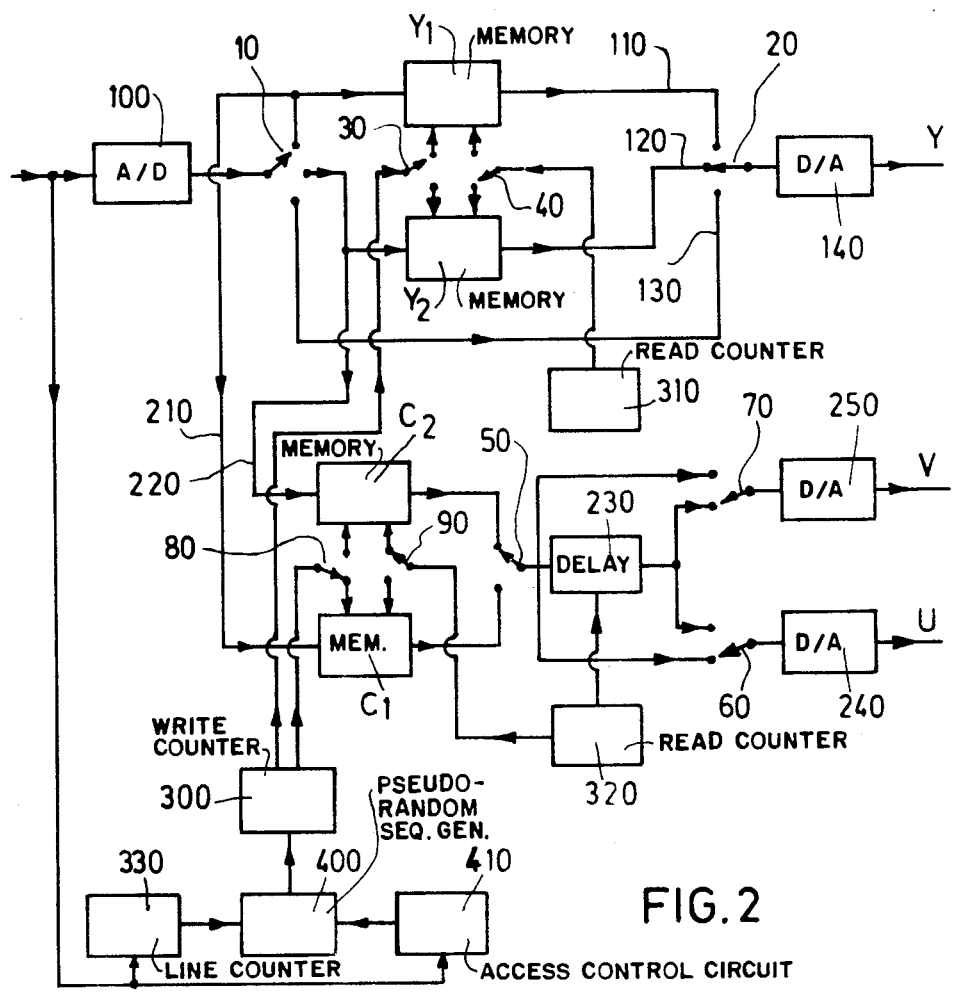
FIG.2

METHOD OF SCRAMBLING TELEVISION PICTURES AND ARRANGEMENT FOR DESCRAMBLING THE PICTURES THUS SCRAMBLED

BACKGROUND OF THE INVENTION

The present invention relates to a method of scrambling television pictures in which measures have been taken to provide that the video signals of the scanning lines are cut in periods located between the line blanking periods in a pseudo-random position and that the sequence of the portions thus formed is changed. It also relates to an arrangement for descrambling the television pictures scrambled in accordance with this method.

The French patent application No. 7821888 filed on July 20th, 1978 by the Public Broadcasting Corporation "Télédiffusion de France" and published Feb. 15th, 1980 under No. 2 431 809 describes a method of scrambling television pictures as described above.

SUMMARY OF THE INVENTION

The object of the invention is to provide a scrambling method which is difficult to decipher, for the time-division multiplex transmission of analog components (called M.A.C. i.e. "Multiplex Analogue Components") proposed more specifically in the report 116/81-UDC 621.396.946 "Direct television broadcasts by satellite: desirability of a new transmission standard" by K. Lucas and M. D. Windram, Independent Broadcasting Authority (IBA), Crawley Court, Winchester, Hants, SO21-2QA, or also, more recently, in the article "Television systems for DBS" published in the periodical "The Radio and Electronic Engineer", Vol. 52, no. 7, July 1982, p. 311 etc. This M.A.C. system ensures the sequential transmission for each scanning line of the chrominance and luminance components, seperated by a short reference period (clamping period) on the black level: an example of the M.A.C. signal is shown in FIG. 5 of the above-mentioned report.

The invention therefore relates to a method described in the foregoing and characterized in that for the so-called M.A.C. video signal transmission systems of the time-division multiplex type for analog chrominance and luminance components, separated by a reference period, the components are each divided, on transmission, in the periods located between the line blanking periods, one after the other into two consecutive signals of which the first signal is then delayed for the duration of the second signal and the second signal is advanced for the duration of the first signal, the reference period separating these components being excluded from this component-dividing and change-of-sequence operations, and the process being intended to be applied on reception in the opposite sense.

The scrambling process as proposed is very efficient, in so far that it has the advantages which are inherent to the process described in the above-mentioned patent application, measures being taken to provide that the reference period located between the chrominance and luminance components are excluded from the scrambling operation, which period, if it was included for each line in the period submitted to scrambling, would be easily detectable in the encoded signals.

DESCRIPTION OF THE DRAWINGS

The details of the invention defined thus, will be more apparent from the following description and the accompanying drawing, which are given by way of non-limitative example and in which:

FIGS. 1a and 1b, respectively, represent for a scanning line an example of a video signal of the M.A.C. type, non-scrambled, and the same signal but scrambled in accordance with the method according to the invention; and FIG. 2 shows an embodiment of an arrangement for descrambling the video signals thus scrambled.

DESCRIPTION OF THE PREFERRED EMBODIMENT

The method of transmitting M.A.C. signals, provides, for each scanning line, as shown in, for example, FIG. 5 of the above-mentioned IBA report, the successive transmission of a line synchronizing word, having a reference period at the chrominance zero level, of the chrominance signal, having a reference period at the black level, and of the luminance signal. The advantages of such a signal structure are described on page 8, column 2, of the report, and will not be repeated here, the main advantage being, however, the consecutive character of the transmission, as a result of which the confusion of the chrominance and luminance spectra is eliminated. Ordinarily, this confusion actually required well-known processing operations which were, however, relatively complicated for the recovery of the picture on reception.

The scrambling method according to the invention, consists, on transmission, in dividing in each scanning line the two chrominance and luminance components, independent from each other, each one into two consecutive signals the first of which is then delayed for the duration of the second signal and the second signal is advanced for the duration of the first signal. This method is illustrated in FIG. 1, in which FIG. 1a shows the video signal of the type M.A.C., not scrambled, for a scanning line, and FIG. 1b shows the same signal, but scrambled: compared to the non-scrambled signal formed by the synchronizing word A, the reference periods B and E, the chrominance signal CD and the luminance signal FG (these last two signals being shown with arbitrary, clearly distinct shapes for a better understanding of the processing operation effected), the scrambled signal is then transmitted in the sequence ABDCEGF, which does not affect the reference period E. On reception, the processing operation then consists in ensuring reestablishment of the original sequences, for the clear recovery of the chrominance and luminance components of that specific scanning line.

This recovery can be effected, for example, by means of the descrambling arrangement shown in FIG. 2, which comprises the essential elements of a conventional digital decoder for decoding the video signals of the M.A.C. type with which, according to the invention, a modified write address counter of the memories, a pseudo-random digital sequence generator and, to control this generator, an access control circuit are associated. To put it more accurately, this descrambling arrangement is composed of the following elements:

(1) input circuits comprising:
   (a) an analog-to-digital converter 100 which receives the scrambled M.A.C. signals;
   (b) a change-over switch 10 having three outputs;
(2) processing circuits for the luminance component, comprising:

(c) an assembly of three parallel paths 110, 120, 130 which connect the three outputs of this change-over switch 10 to three inputs of a change-over switch 20, the first and second of these paths 110 and 120 including a first and a second memory $Y_1$ and $Y_2$, respectively, for storing the luminance component, and which are alternately addressed by a write counter 300 and a first read counter 310, whereas the third path 130 is a direct path;

(d) a first digital-to-analog converter 140 which receives the output signal of the change-over switch 20 and produces the luminance signal which is denoted by Y in current usage;

(3) circuits for processing the chrominance component comprising:

(e) an assembly of two parallel paths 210 and 220 which, by means of third and fourth memories $C_1$ and $C_2$ for storing the chrominance component and which are alternately addressed by the write counter 300 and a second read counter 320, are connected to two inputs, respectively, of a change-over switch 50, the output of this change-over switch 50 being connected to the input of a digital delay line 230 which is controlled by the read counter 320 (and provided, for example, by a shift register) for delaying the chrominance component for the duration of one line, and also to the first input of change-over switches 60 and 70, respectively, whose other input receive the output of the said delay line;

(f) second and third digital-to-analog converters 240 and 250 which receive the outputs of the change-over switches 60 and 70, respectively, and produce the color difference signals usually designated as U and V;

(4) descrambling control circuits:

(g) a line counter 330 for counting the lines within each field;

(h) a pseudo-random digital sequence generator 400 which is synchronized by means of the line counter 330; and (i) an access control circuit 410 which applies to the pseudo-random sequence generator a starting word which constitutes the scrambling key.

The descrambling arrangement thus formed operates as follows. The pseudo-random sequence generator 400, which is synchronized by the counter 330 and receives from the access control circuit 410 the key descrambled by it on reception of the scrambled M.A.C. signals, generates a random digital word from which there are derived the two abscissa $x_1$ and $x_2$ of the dividing points of the analog chrominance and luminance components, obtained during scrambling on transmission. From then, on reception of the signals, the period B is written into the first part of the memory, thereafter the fraction D, beginning at the address of the abscissa $x_1$, and the fraction C between B and D; this writing action is effected successively in the memory $C_1$ or the memory $C_2$ according to the parity of the line, by means of the write counter 300 which is controlled by the pseudo-random sequence generator 400 by addressing either the one or the other of the two memories $C_1$ and $C_2$ as a function of a position of a change-over switch 80.

When writing of the chrominance component has been effected, then there are successively written into the memory $Y_1$ or the memory $Y_2$ according to the parity of the line, and by means of the same write counter 300 which addresses either the one or the other of these two memories as a function of the position of a change-over switch 30, the reference period E in the first register of the memory, thereafter the fraction G starting from the address of the abscissa $x_2$, and the fraction F between E and G.

Finally, to recover the luminance and chrominance signals, the memories $Y_1$ and $C_1$, or $Y_2$ and $C_2$ are simultaneously read again in an ascending sequence of the addresses, by means of the counters 310 and 320. The rates at which the luminance and chrominance memories are read are chosen such that the useful signals FG and CD are recovered in a period of time corresponding to the useful line scanning period, i.e. approximately 52 microseconds in the current European 625-line standard. The rate at which the chrominance memories are read is therefore less than the luminance reading rate which itself is less than the write rate of the counter 300. The read counter 320 addresses the memories $C_1$ and $C_2$ alternately by means of a change-over switch 90, and the counter 310 alternately addresses the memories $Y_1$ and $Y_2$ by means of a change-over switch 40.

It should here be noted that the nine change-over switches 10 to 90 are controlled by the counter 330, but for the sake of simplicity of FIG. 2 its control leads are not shown.

The presence of the digital delay line 230 is not connected with the descrambling operation itself. This delay line is provided to enable the simultaneous recovery, at the output of the digital-to-analog converters 240 and 250, of the color difference signals U and V which are transmitted alternately. The control of this delay line 230 is effected by the read counter 320 of the memories $C_1$ and $C_2$.

As is the case in the above-mentioned French Patent Application, and for the purpose of obviating the drawbacks which may result from splitting up the chrominance and luminance components, it is advantageous to repeat at the end of the fractions C and F a short portion of the beginning of the fractions D and G, respectively. So as to ensure that the duration of the transmitted signal remains unchanged, it is necessary to suppress at the end of the signals D and G two signal portions whose durations are equal to the respective durations of the repeated portions.

What is claimed is:

1. A method of scrambling television pictures in which measures have been taken to provide that the video signals of the scanning lines are cut in periods located between the line blanking periods in a pseudo-random position and that the sequence of the portions thus formed is changed, characterized in that for M.A.C. video signals transmission systems of the time-division multiplex type for analog chrominance and luminance components separated by a reference period, said components are each divided, on transmission, in the periods located between the line blanking periods, one after the other, into two consecutive signals (C, D) and (F, G) of which the first signals (C) and (F) are then delayed for the duration of the second signals (D) and (G), and the second signals (D) and (G) are advanced for the duration of the first signals (C) and (F), the reference period (E) separating these components being excluded from this component-dividing and change-of-sequence operations and said processing operation being intended to be applied on reception in the opposite sense.

2. An arrangement for descrambling television signals, said signals being of the M.A.C. type wherein in each scanning line, a chrominance component and a luminance componet are multiplexed and separated by a reference period, said signals having been scrambled by dividing said chrominance component and said luminance componet into respective first and second sections and by delaying said first sections by the duration of said sections, respectively, and by advancing said second sections by the duration of said first sections, characterized in that said arrangement comprises means for delaying said second sections by the duration of said first sections and means for advancing said first sections by the duration of said second sections wherein said means for delaying and said means for advancing effect an inverse recovery operation of the original sequences of the first and second section of the chrominance and luminance components, respectively.

3. An arrangement as claimed in claim 2, characterized in that said arrangement comprises:
  (1) input circuits comprising:
    (a) an analog-to-digital converter which receives at an input the scrambled M.A.C. signals; and
    (b) a first change-over switch having three outputs;
  (2) processing circuits for the luminance component, comprising:
    (c) an assembly of three parallel paths which connect the three outputs of the first change-over switch to three inputs of a second change-over switch, a first and second of said paths including a first and a second memory, respectively, for storing the luminance component and which are alternately addressed by a write counter and a first read counter, whereas the third path is a direct path; and
    (d) a first digital-to-analog converter which receives the output signal of the second change-over switch and produces the luminance signal Y;
  (3) processing circuits for the chrominance component, comprising:
    (e) an assembly of two parallel paths and which, by means of third and fourth memories for storing the chrominance component and which are alternately addressed by the write counter and a second read counter, are connected to the two inputs, respectively, of a fifth change-over switch, the output of this fifth change-over switch being connected to the input of a digital delay line which is controlled by the second read counter for delaying the chrominance component for the duration of one line, and also to the first input of the sixth change-over switch and a seventh change-over switch, respectively, whose other inputs receive the output of the said delay line; and
    (f) second and third digital-to-analog converters which receive the outputs of the sixth and seventh change-over switches, respectively, and produce the color difference signals U and V; and
  (4) descrambling control circuits, comprising:
    (g) a line counter for counting the scanning lines within each field;
    (h) a pseudo-random digital sequence generator which is synchronized by means of the line counter; and
    (i) an access control circuit which applies the pseudo-random sequence generator, a starting word constituting the scrambling key, and characterized in that the write counter is provided to address the memories as a function of the abscissa of the dividing points of the chrominance and luminance components, these abscissa being derived from pseudo-random digital sequences produced by said generator.

* * * * *

UNITED STATES PATENT AND TRADEMARK OFFICE
CERTIFICATE OF CORRECTION

PATENT NO. : 4,747,138

DATED : May 24, 1988

INVENTOR(S) : Gerard J.M. Marie

It is certified that error appears in the above-identified patent and that said Letters Patent is hereby corrected as shown below:

IN THE CLAIMS

Claim 3, line 1 and 2  Delete in its entirety and substitute:

--An arrangement for descrambling television signals, said signals being of the M.A.C. type wherein in each scanning line, a chrominance component and a luminance component are multiplexed and separated by a reference period, said signals having been scrambled by dividing said chrominance component and said luminance component into respective first and second sections and by delaying said first sections by the duration of said second sections, respectively, and by advancing said sections by the duration of said first sections, characterized in that said arrangement comprises:--

UNITED STATES PATENT AND TRADEMARK OFFICE
CERTIFICATE OF CORRECTION

PATENT NO. : 4,747,138

DATED : May 24, 1988

INVENTOR(S) : Gerard J.M. Marie

It is certified that error appears in the above-identified patent and that said Letters Patent is hereby corrected as shown below:

IN THE CLAIMS

Claim 3, line 26    delete "which"

line 56    change "abscissa" to

--abscisse--

Signed and Sealed this

Seventh Day of March, 1989

Attest:

DONALD J. QUIGG

Attesting Officer    Commissioner of Patents and Trademarks